(12) United States Patent
Inayama et al.

(10) Patent No.: US 6,774,521 B2
(45) Date of Patent: Aug. 10, 2004

(54) BRUSHLESS DC MOTOR

(75) Inventors: Hirohide Inayama, Yamatokoriyama (JP); Tomofumi Takahashi, Komaki (JP); Minoru Kitabayashi, Nagoya (JP)

(73) Assignee: Koyo Seiko Co., Ltd., Osaka (JP)

( * ) Notice: Subject to any disclaimer, the term of this patent is extended or adjusted under 35 U.S.C. 154(b) by 91 days.

(21) Appl. No.: 10/000,632

(22) Filed: Nov. 1, 2001

(65) Prior Publication Data

US 2002/0171308 A1 Nov. 21, 2002

(30) Foreign Application Priority Data

May 16, 2001 (JP) ........................................ 2001-147051

(51) Int. Cl.[7] .............................................. H02K 21/12
(52) U.S. Cl. .................................... 310/156.53; 310/51
(58) Field of Search .......... 310/156.38, 156.43–156.47, 310/156.53, 156.56

(56) References Cited

U.S. PATENT DOCUMENTS

| | | | | |
|---|---|---|---|---|
| 5,041,749 A | * | 8/1991 | Gaser et al. ................ | 310/156 |
| 5,990,592 A | * | 11/1999 | Miura et al. ................ | 310/156 |
| 5,990,593 A | * | 11/1999 | Narita et al. ................ | 310/156 |
| 6,031,311 A | * | 2/2000 | Lee ............................ | 310/156 |
| 6,034,459 A | * | 3/2000 | Matsunobu et al. ........ | 310/156 |
| 6,133,662 A | * | 10/2000 | Matsunobu et al. ........ | 310/156 |
| 6,188,157 B1 | * | 2/2001 | Tajima et al. ............... | 310/156 |
| 6,351,050 B1 | * | 2/2002 | Coles ......................... | 310/156.53 |

FOREIGN PATENT DOCUMENTS

JP      5-168181     7/1993

* cited by examiner

*Primary Examiner*—Tran Nguyen
(74) *Attorney, Agent, or Firm*—Darby & Darby

(57) ABSTRACT

In a brushless DC motor constructed by a rotor 2 to which a permanent magnet 3 is attached; and a stator 1 having a plurality of slots, when an effective opening angle of magnetic pole of the rotor 2 that was set to a predetermined opening angle whose base is the rotation axis of the rotor 2 is θ2 and a salient area opening angle of magnetic pole formed within the effective opening angle θ2 of magnetic pole is θ3, the opening angles θ2 and θ3 are set so that cogging torque generated by the effective opening angle θ2 of magnetic pole and cogging torque generated by the salient area opening angle θ3 of magnetic pole are mutually in antiphase. Accordingly, a brushless DC motor capable of reducing cogging torque is realized.

8 Claims, 8 Drawing Sheets

US 6,774,521 B2

BRUSHLESS DC MOTOR

BACKGROUND OF THE INVENTION

1. Field of the Invention

The present invention relates to reduction of cogging torque of a brushless DC motor and particularly provides a brushless DC motor capable of readily reducing the cogging torque without sacrificing the electrical characteristics.

2. Description of Related Art

In a conventional brushless DC motor (hereinafter referred to as the "motor"), cogging torque is generated due to the presence of slots provided for windings. More specifically, field magnetic flux that is generated from a magnetic pole of a rotor during relative movement of the rotor and a stator changes periodically whenever a magnetic pole of the rotor crosses a slot opening of the stator, and changes the magnetic flux distribution in gaps. Therefore, the cycle and magnitude of this cogging torque depend on the number of slots formed in the stator and the number of magnetic poles of the rotor, and the waveform thereof with respect to the rotation angle changes largely depending on the slot openings and the shapes and dimensions of the magnetic poles of the rotor.

Conventionally, various methods have been proposed for the reduction of cogging torque, and a generally used method smoothes the change in the magnetic flux interlinking arbitrary stator teeth (hereinafter referred to as "teeth") by making magnetic spatial gaps between the rotor and the stator larger and unequal at both ends of the rotor's magnetic pole in the rotating direction of the rotor. Moreover, by skewing the magnetic pole of the rotor in the direction of the rotation axis, the change in the interlinkage magnetic flux interlinking the stator that is caused when the interpole portion of the rotor crosses the teeth is reduced.

The reduction of cogging torque by means of unequal gaps is usually implemented by shaping the permanent magnets, and the shape needs to be changed according to the tooth shape and the slot opening size. Furthermore, in a type of motor incorporating permanent magnets in the rotor, attempts to reduce cogging torque were made by changing the curvature in the shape of the outer rim of the rotor, but, under the present conditions, a large number of trial manufacture and various analysis are carried out to determine the shape of the permanent magnets and the curvature of the outer rim of the rotor. Although the cogging torque was considerably improved by such attempts, it was hard to say that the improvement was sufficient. The more the reduction of the cogging torque by such measures, the wider the gap in the interpole portion of the rotor, resulting in a lowering of interlinkage magnetic flux from the rotor to the stator.

In addition, there is another method in which the magnetic pole of the rotor is skewed as mentioned above. In this case, an advantageous effect can be expected if the angle of skew is large, but the effective magnetic flux of the magnetic pole is reduced in proportion to the skew angle and impairs the motor characteristics. From the view point of the electrical characteristics as the motor, the permanent magnet in a portion where skew is present does not function as effective magnetic flux in the motor performance, and it can be said that a useless permanent magnet is used.

Further, in recent years, many motors use rare-earth permanent magnets of high magnetic flux density for the purposes of achieving small-sized, high-performance motors, and the permanent magnets have also become smaller in size. Therefore, the magnetic loading increases and consequently cogging toque itself becomes larger, and it has become difficult to take sufficient countermeasures by the cogging torque reducing methods of conventional structures. Additionally, in the method for shaping permanent magnet, it is necessary to shape small-sized permanent magnets with high precision, and it is difficult to shape such permanent magnets. In the method adopting skewing, if skewing is to be implemented by a combination of permanent magnets, a permanent magnet in a segment is itself skewed, and thus this method is completely unsuitable for mass-production. FIG. 1 shows a perspective view of a rotor implemented by a combination of skewed permanent magnets. In FIG. 1, a rotor is constructed by arranging four permanent magnets having a skew angle θS in the direction of the rotation axis on the surface of a rotor in the circumferential direction.

Alternatively, in a method adopting no skew in the shape of a permanent magnet, a ring-shaped permanent magnet is sometimes used. In this method, the ring-shaped permanent magnet is electrically skewed by polarization with a skewed magnetic yoke. However, as described above, since a useless area, that is, a skewed portion, is present, the problem of using a magnet that is not concerned in the motor characteristics is not solved.

BRIEF SUMMARY OF THE INVENTION

The present invention was made with the aim of solving the above problems, and an object of the invention is to provide a brushless DC motor capable of readily reducing cogging torque without sacrificing the electrical characteristics.

A brushless DC motor according to the present invention is a brushless DC motor comprising a rotor to which a permanent magnet is attached; and a stator having a plurality of slots, and is characterized in that, when an effective opening angle of magnetic pole of the rotor that was set to a predetermined opening angle whose base is a center of a shaft hole of the rotor (hereinafter all opening angles used in the present invention refer to opening angles whose base is the center of the shaft hole of the rotor) is θ2 and a salient area opening angle of magnetic pole formed within the effective opening angle θ2 of magnetic pole is θ3, the opening angles θ2 and θ3 are set so that cogging torque generated by the effective opening angle θ2 of magnetic pole and cogging torque generated by the salient area opening angle θ3 of magnetic pole are mutually in antiphase.

Moreover, a brushless DC motor according to the present invention is characterized in that the effective opening angle θ2 of magnetic pole of the rotor is not smaller than an electrical angle of 120° whose base is a pole center of the effective opening angle θ2 of magnetic pole of the rotor and is an opening angle formed with both edges of stator teeth closest to the electrical angle of 120°; likewise the salient area opening angle θ3 of magnetic pole of the rotor is not larger than the electrical angle of 120° whose base is the pole center of the effective opening angle θ2 of magnetic pole of the rotor and is an opening angle formed with both edges of stator teeth closest to the electrical angle of 120°; and a recessed area wider than a gap in the salient area opening angle θ3 of magnetic pole of the rotor is formed at least in a portion of the effective opening angle θ2 of magnetic pole beyond the salient area opening angle θ3 of magnetic pole.

Furthermore, a brushless DC motor according to the present invention is characterized by having a relationship $$0.75 \leq \{(g1/g2)^2 + 1\}/2 < 1 \qquad (1)$$

where g2 is a gap between a recessed area of the effective opening angle of magnetic pole θ2 of the rotor and the stator, and g1 is a gap between the rotor and the stator in any area of the salient area opening angle θ3 of magnetic pole.

In addition, a brushless DC motor according to the present invention is characterized in that the salient area opening angle θ3 of magnetic pole of the rotor is formed by a magnetic material holding a permanent magnet therein.

The above and further objects and features of the invention will more fully be apparent from the following detailed description with accompanying drawings.

DETAILED DESCRIPTION OF THE INVENTION

Figure 1:
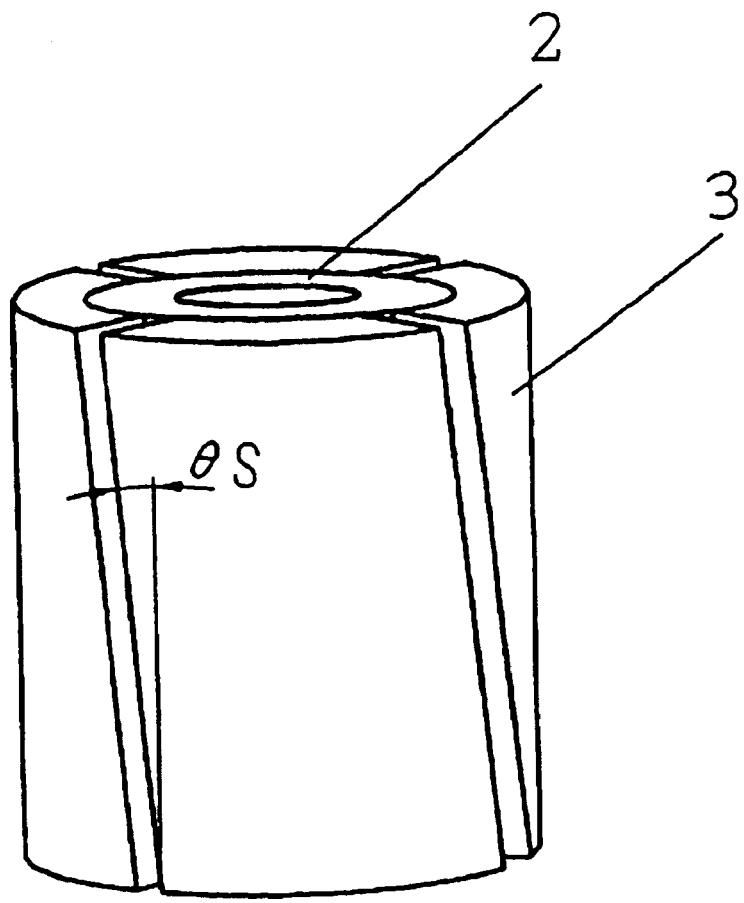
FIG. 1 is a perspective view of a rotor showing a conventional example.
Figure 2:
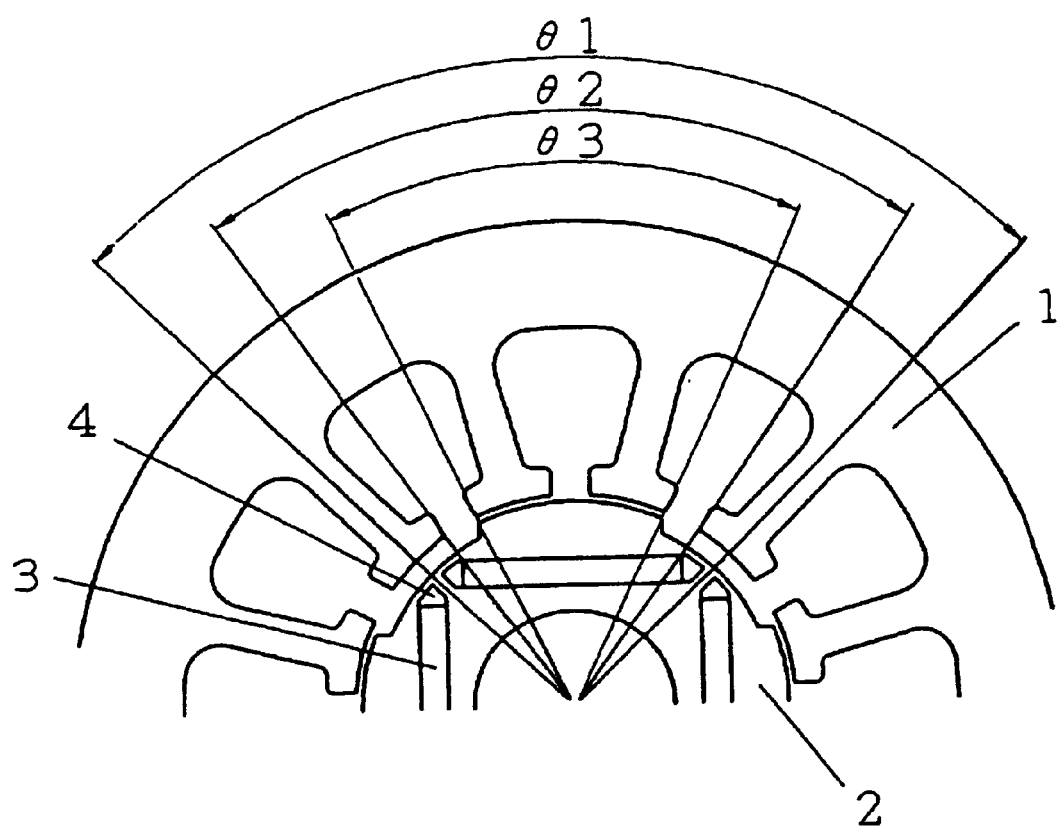
FIG. 2 is a transverse cross sectional view of a distributed winding motor showing an embodiment of the present invention.
Figure 3:
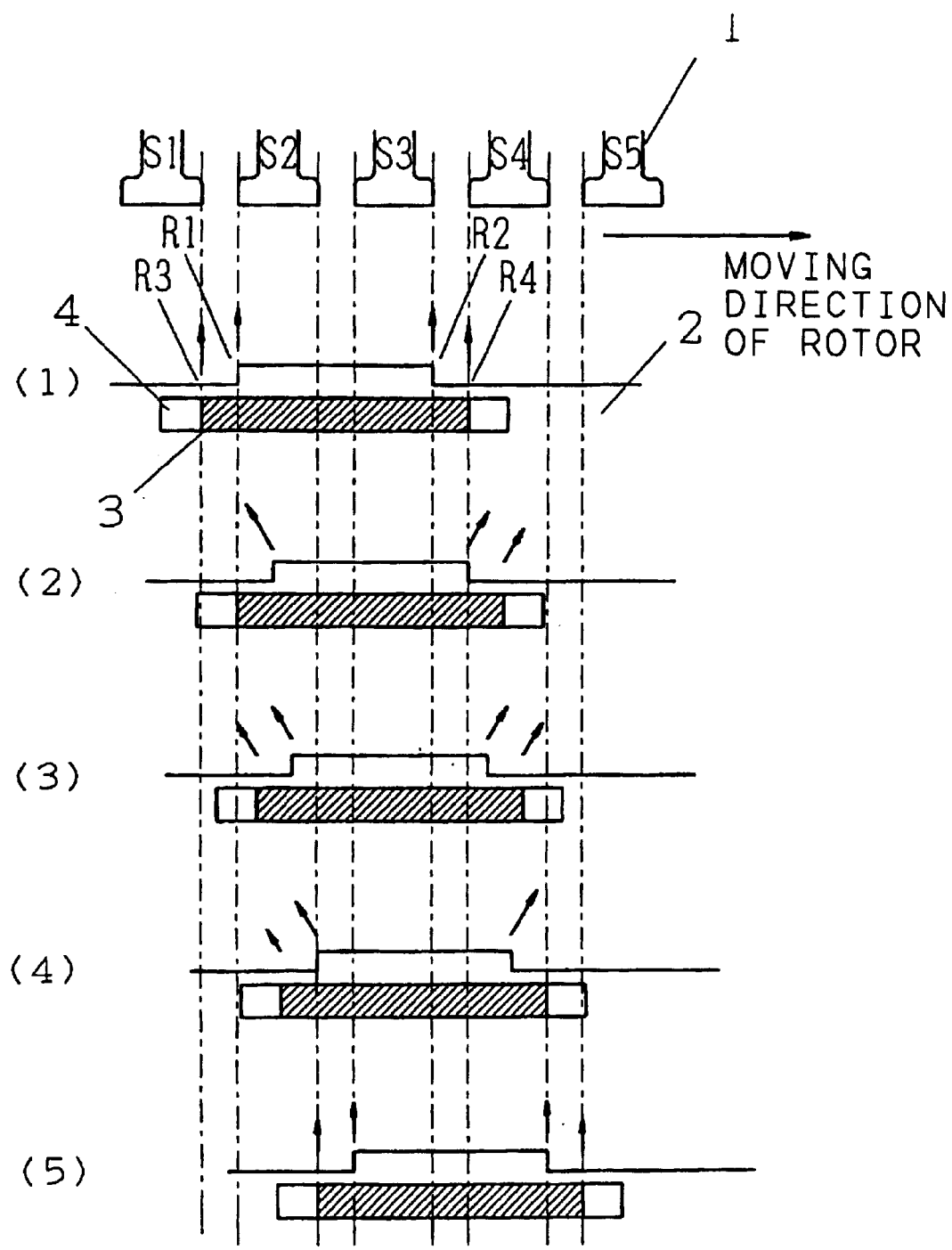
FIG. 3 is an explanatory view showing the action of forces according to the embodiment of the present invention.
Figure 4:
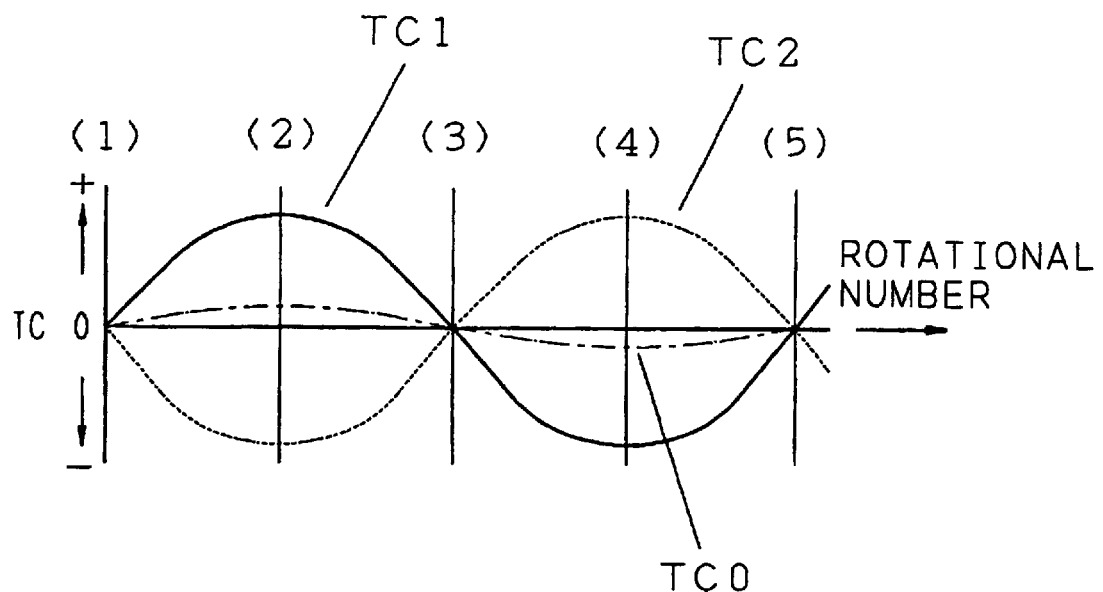
FIG. 4 is a view showing the state of cogging torque of the conventional example in FIG. 1.

The following description will explain an embodiment of the present invention with reference to FIG. 2 through FIG. 4. FIG. 2 shows a motor comprising a stator with 12 slots and a four-pole rotor. However, windings are omitted for easily understandable illustration. In FIG. 2, numeral 1 represents the stator, 2 represents the rotor, 3 represents a permanent magnet, and 4 represents a hollow hole for storing the permanent magnet 3. Inside of the hollow hole 4 except the portion occupied by the permanent magnet 3, the air exists, but a non-magnetic material may be filled. θ1 indicates a structural opening angle of magnetic pole of the rotor 2, θ2 indicates an effective opening angle of magnetic pole in the magnetic sense, and θ3 indicates a salient area opening angle of magnetic pole. θ1, θ2 and θ3 are bilaterally symmetrical with respect to the center of the magnetic pole.

The magnetic pole pitch in the structure of the motor of this embodiment is a three-slot pitch given by "12 slots/four poles". Accordingly, one slot pitch is 30° in mechanical angle and 60° in electrical angle. Here, the salient area opening angle θ3 of magnetic pole of the rotor 2 is set to an angle equal to an opening angle of the outer edges of two teeth of the stator 1 with respect to the magnetic pole. Further, the effective opening angle θ2 of magnetic pole is set to an angle that is widen on the right and left sides, respectively, from the salient area opening angle θ3 of magnetic pole by an amount of a slot opening angle of the stator 1, i.e., an angle equal to a slot opening angle of the outer edges of consecutive three slot openings of the stator 1 with respect to the magnetic pole.

With reference to FIG. 3, the following description will explain the state of cogging torque according to such an embodiment. FIG. 3 is a view developed in the circumferential direction of the motor to explain the relationship between the stator 1 and rotor 2 of FIG. 2 about one magnetic pole of the rotor 2. The same numerals as in FIG. 2 represent the same elements and same functions. S1 through S5 in FIG. 3 represent the teeth of the stator 1, R1 and R2 are pole tip areas in the salient area of magnetic pole, and R3 and R4 are pole tip areas of effective magnetic pole. In addition, (1) through (5) in FIG. 3 respectively illustrate states when the rotor 2 was successively moved in the right direction, and, although the pole tip areas R1 through R4 are not indicated in (2) through (5) of FIG. 3, they are the same as in (1). In the drawing, forces acting in the pole tip areas R1 and R2 of the salient area of magnetic pole of the rotor 2 and forces acting in the pole tip areas R3 and R4 of the effective magnetic pole are depicted by arrows. Cogging torque of each pole is a component in the moving direction of vector of the composite force.

In the state of (1) of FIG. 3, the left side pole tip area R1 of the salient area of magnetic pole of the rotor 2 coincides with the left edge of the tooth S2, while the right side pole tip area R2 of the salient area of magnetic pole coincides with the right edge of the tooth S3. The left side pole tip area R3 of the effective magnetic pole coincides with the right edge of the tooth S1, which is located on the left side of the salient area of magnetic pole at an interval of one slot opening, while the right side pole tip area R4 of the effective magnetic pole coincides with the left edge of the tooth S4, which is located on the right side of the salient area of magnetic pole at an interval of one slot opening. The cogging torque is a force acting to move the rotor so that the magnetic flux generated from the magnetic pole of the rotor falls in a condition where the direction and amount of the magnetic flux interlinking the teeth of the stator through the gap are balanced in the relative condition of the rotor and stator. Therefore, even when the tooth of the stator or slot opening are present within the angle of magnetic pole of the rotor in balanced condition, since the amount and direction of the magnetic flux from the rotor do not change and are balanced, if the acting forces are composited, the cogging torques are averaged out and are not apparent. Accordingly, for cogging torque, the conditions in the vicinity of both ends of the magnetic pole of the rotor can be taken into consideration.

In (1) and (3) of FIG. 3, since the teeth and slot openings of the stator that face the salient area of magnetic pole and effective magnetic pole of the rotor 2 are completely symmetrical, the force acting in the magnetic pole as a whole is only a force in the radial direction, and cogging torque of a component in the moving direction of the rotor 2 is not generated. Besides, since (5) is in the same positional relationship as (1), needless to say, the cogging torque is not generated.

When the rotor 2 moves in a section from (1) to (2), a force in the left direction acts in the pole tip area R1 because of attraction by the tooth S2 and a force in the right direction acts in the pole tip area R4 because of attraction by the tooth S4, and these forces are cancelled out because they act in the opposite directions. Since the pole tip areas R2 and R3 face the slot openings, the forces are weak. The pole tip area R2 is attracted by the tooth S3 up to the middle point between the teeth S3 and S4 and a force in the left direction acts, but, when the pole tip area R2 crosses the middle point, it is attracted by the tooth S4 and a force in the right direction acts. The pole tip area R3 is attracted by the tooth S1 up to the middle point between the teeth S1 and S2 and a force in the left direction acts, but, when the pole tip area R3 crosses the middle point, it is attracted by the tooth S2 and receives a force in the right direction. In either of these states, since the forces act in mutually opposite directions, they are cancelled out and the force of the moving direction component becomes zero or only a force of a slight residue is present.

When the rotor 2 moves from (2) to (3) of FIG. 3, a force in the left direction acts in the pole tip areas R1 and R3 because of attraction by the tooth S2, and a force in the right direction acts in the pole tip areas R2 and R4 because of attraction by the tooth S4. Thus, since these forces act in the opposite directions, they are cancelled out, and the force of the moving direction component becomes zero or only a force of a slight residue is present. Note that since the movement of the rotor 2 from (3) to (4) is the same as the above-described movement of the rotor 2 from (2) to (3) except that the moving direction of the rotor 2 is reversed, the forces acting in the respective pole tip areas of the rotor 2 do not change for this magnetic pole as a whole with the only exception that the respective forces act in the opposite directions, and therefore explanation is omitted. Moreover, since the movement of the rotor 2 from (4) to (5) is also the same as the above-described movement of the rotor 2 from (1) to (2) except that the moving direction of the rotor 2 is reversed, the forces acting in the respective pole tip areas of the rotor 2 do not change for this magnetic pole as a whole with the only exception that the respective forces act in the opposite directions, and therefore explanation is omitted like the above.

In FIG. 4, the actions of the above forces are shown as a composite cogging torque TC1 in the pole tip areas R1 and R2 of the salient area of magnetic pole of the rotor 2 and a composite cogging torque TC2 in the pole tip areas R3 and R4 of the effective magnetic pole. More specifically, when the salient area of magnetic pole moves away from the facing tooth of the stator 1 at its end, since an end of the effective magnetic pole of this magnetic pole overlaps the closest tooth at the opposite end of the same magnetic pole, cogging torques are mutually in antiphase. Accordingly, the totally composite cogging torque TC0 becomes zero, or only a slight difference between TC1 and TC2 remains.

Figure 5:
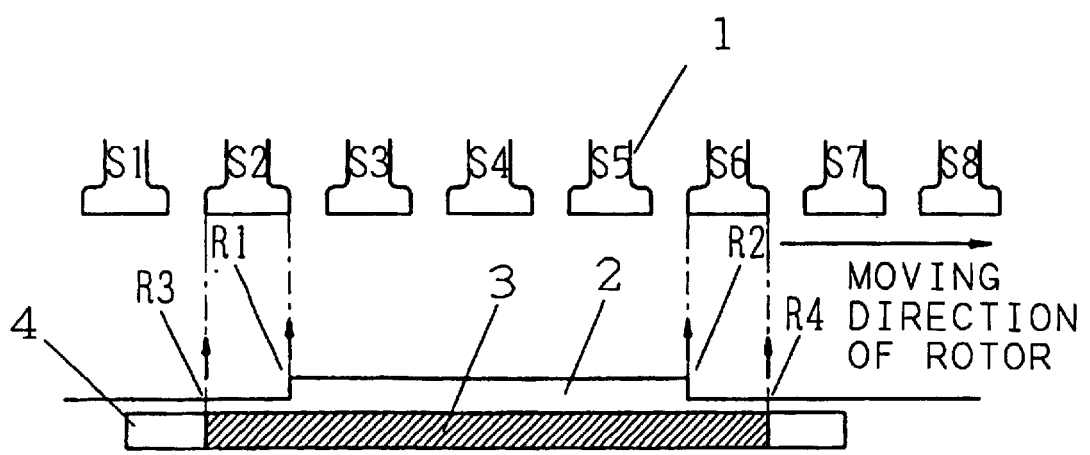
FIG. 5 is an explanatory view showing the action of forces according to another embodiment of the present invention.

In addition, FIG. 5 shows another embodiment in which a large number of teeth of the stator 1 face the rotor within the opening angle θ1 of magnetic pole of the rotor 2. Like the method used in FIG. 2 through FIG. 4, this embodiment is shown by a view developed in the circumferential direction of the motor. The same numerals as in FIG. 3 represent the same elements and same functions. The left side pole tip area R1 of the salient area opening angle θ3 of magnetic pole of the rotor 2 coincides with the right edge of the tooth S2, while the right side pole tip area R2 of the salient area opening angle θ3 of magnetic pole coincides with the left edge of the tooth S6. The left side pole tip area R3 of the effective opening angle θ2 of magnetic pole is located on the left side of the salient area opening angle θ3 of magnetic pole at an interval of one tooth and coincides with the left edge of the tooth S2, while the right side pole tip area R4 of the effective opening angle θ2 of magnetic pole is located on the right side of the salient area of magnetic pole at an interval of one tooth and coincides with the right edge of the tooth S6.

Hence, it is apparent from a comparison of FIG. 5 with the one shown in FIG. 2 through FIG. 4 that the pole tip areas of the salient area of magnetic pole and the pole tip areas of effective magnetic pole are simply replaced with each other, and therefore the cogging torques are in antiphase in the respective areas and are cancelled out in the same manner as in the conditions explained in FIG. 2 through FIG. 4, thereby providing the same effects.

Figure 6:
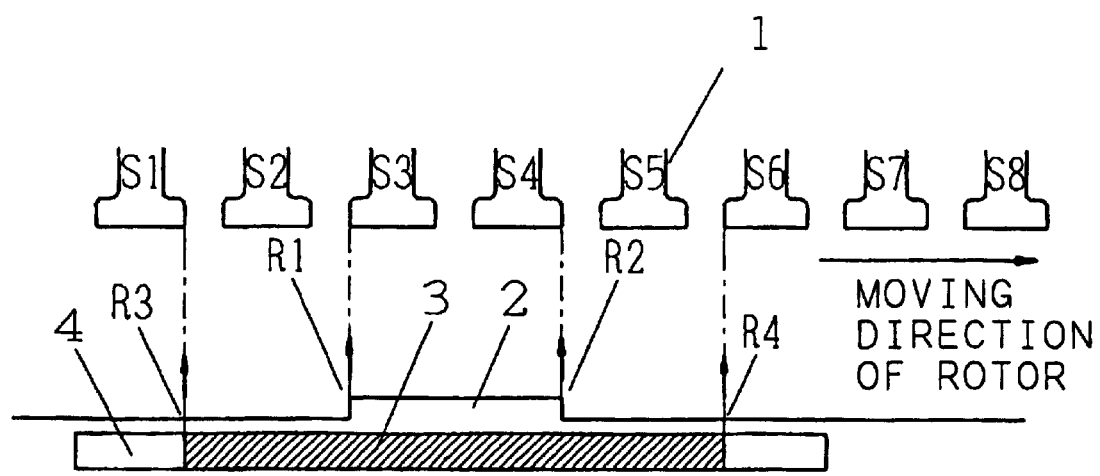
FIG. 6 is an explanatory view showing the action of forces according to another embodiment of the present invention.

FIG. 6 shows another embodiment in which the left side pole tip area RI of the salient area opening angle θ3 of magnetic pole of the rotor 2 coincides with the left edge of the tooth S3, while the right side pole tip area R2 of the salient area opening angle θ3 of magnetic pole coincides with the right edge of the tooth S4. An opening angle equivalent to one slot pitch of the stator 1 is present between both pole tip areas R3, R4 of the effective opening angle θ2 of magnetic pole and both pole tip areas R1, R2 of the salient area opening angle θ3 of magnetic pole, respectively, and the left side pole tip area R3 of the effective opening angle θ2 of magnetic pole coincides with the right edge of the tooth S1, while the right side pole tip area R4 of the effective opening angle θ2 of magnetic pole coincides with the left edge of the tooth S6. Note that although FIG. 6 illustrates a state in which an opening angle equivalent to one slot pitch of the stator 1 is present between both pole tip areas R3, R4 of the effective opening angle θ2 of magnetic pole and both pole tip areas R1, R2 of the salient area opening angle θ3 of magnetic pole, respectively, the number of slot pitches is not limited and the same effects are obtained even if a plurality of slot pitches are present.

In other words, since the action of force in each pole tip area changes according to the facing stator pitch, even if there is a difference in opening angle corresponding to a plurality of slot pitches between both pole tip areas R1, R2 of the salient area opening angle θ3 of magnetic pole of the rotor 2 and both pole tip areas R3, R4 of the effective opening angle θ2 of magnetic pole, the action of force in each pole tip does not change and the effects of the present invention can be obtained without any trouble because only the teeth of the stator on which the forces act will change. Accordingly, as the number of slots included in one excitation pole of the stator 1 increases, the combination of the effective opening angle θ2 of magnetic pole and the salient area opening angle θ3 of magnetic pole is increased by factorial and the flexibility of design is increased, and the state of cancellation of cogging torques does not change.

As explained above, in this embodiment of the present invention, reduction of cogging torque can be achieved by setting the respective opening angles so that cogging torque generated by the effective opening angle θ2 of magnetic pole and cogging torque generated by the salient area opening angle θ3 of magnetic pole are mutually in antiphase.

Figure 7:
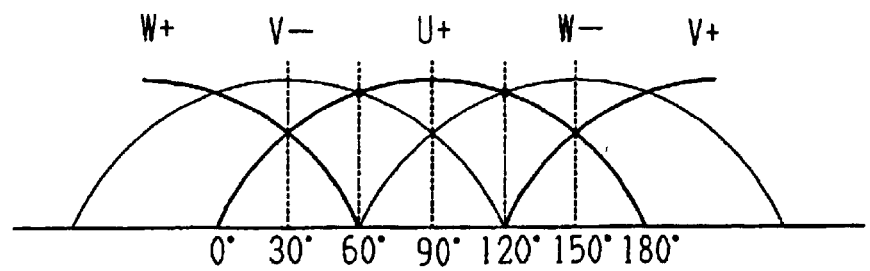
FIG. 7 is a view showing induced voltage timings of a three-phase motor.
Figure 8:
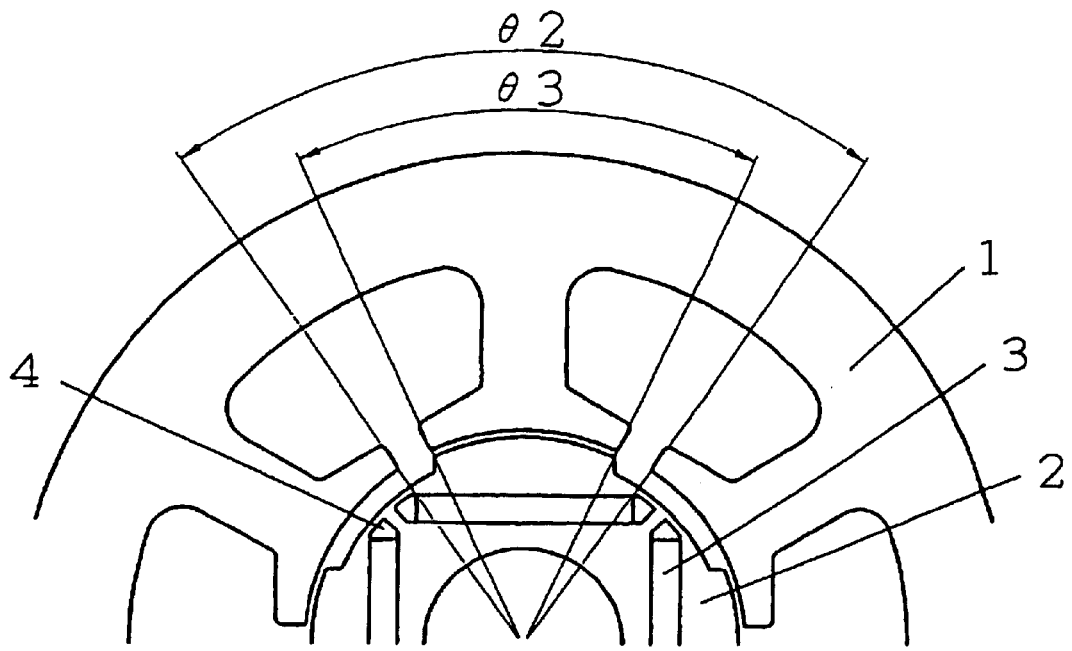
FIG. 8 is a transverse cross sectional view of a concentrated winding motor showing another embodiment of the present invention.

Referring to FIG. 7 and FIG. 8, the following description will explain another embodiment of the present invention. In general, it has been well known that, in a three-phase motor, power is supplied at a 120° phase area centering around an electrical angle of 90° as a phase voltage. The reasons for this are that the value of the electrical angle of 120° coincides with a phase difference among three phases of power to be supplied to the motor and therefore two phases among the three phases are selected for a rotating vector and connected at 120° to maintain stable rotation of the motor, and supply of certain power in a 120° sectional area centering around the electrical angle of 90° is equivalent to supply of power in a 180° sectional area by sinusoidal wave. Hence, an effective magnetic pole of the rotor capable of generating a change area of the magnetic flux in a mechanical angle corresponding to at least the power supply area of the electrical angle of 120° is sufficient. Accordingly, it is possible to make the width of the associated permanent magnet in the circumferential direction relatively small, thereby advantaging in manufacturing costs.

This is shown in FIG. 7. FIG. 7 shows three-phase induced voltage waveforms of motor windings by phase voltages, and symbols U, V, W in FIG. 7 indicate the phases, while suffixes show polarities. When a waveform corresponding to a section from 30° to 90° in electrical angle with respect to a waveform of U+ is V− and a waveform corresponding to a section from 90° to 150° in electrical angle with respect to the waveform of U+ is W−, if power is supplied to generate these two phases, it is possible to rotate the motor. By achieving the same condition as in the case of U+ for the next electrical angle on the basis of V+ and also for the following electrical angle on the basis of W+, it is possible to maintain rotation. Besides, W+, which was not selected between the electrical angle of 30° and 60° in a section where states are U+ and V−, for example, is not supplied power, but the amount is little. Therefore, the degradation of the electrical characteristics as the motor is small.

Thus, as clearly seen from the above, in order to lower the cogging torque by the present invention without considerably impairing the electrical characteristics, in view of the electrical characteristics, when the effective opening angle of magnetic pole of the rotor 2 is set to an angle which is close to an electrical angle of 120° and formed by the effective opening angle θ2 of magnetic pole with respect to both edges of the teeth larger than 120°, moreover the salient area opening angle θ3 of magnetic pole is set to an angle which is close to an electrical angle of 120° within the effective opening angle θ2 of magnetic pole and formed by the salient area opening angle θ3 of magnetic pole with respect to both edges of the teeth narrower than 120°, it is possible to reduce the cogging torque.

Further, referring to FIG. 8, the following description will explain an application of this embodiment to a so-called one-teeth one-pole concentrated winding motor. FIG. 8 illustrates an example in which a three-phase four-pole motor structure is constructed by a 6-slot stator. In this case, it is also possible to reduce the cogging torque by a structure similar to the above-described structure where a plurality of teeth are present in each pole to face the opening angle of magnetic pole of the rotor 2. Since the condition of reducing the cogging torque is the same as above with the only exception that the teeth facing the rotor 2 in FIG. 2 is made one tooth, explanation is omitted. In the embodiment shown in FIG. 8, the opening angle of one slot pitch is 60° in mechanical angle and 120° in electrical angle.

Therefore, in the case of applying this invention, the salient area opening angle θ3 of magnetic pole of the rotor 2 is made the same as an opening angle of the width of a tooth of the stator 1, and the effective opening angle θ2 of magnetic pole is set to an opening angle formed with both edges of the adjacent teeth sandwiching the above tooth. With this settings, the effective opening angle θ2 of magnetic pole of the rotor 2 becomes an angle given by adding one slot opening angle of the stator to the electrical angle of 120°, and the salient area opening angle θ3 of magnetic pole becomes an angle given by subtracting one slot opening angle of the stator from the electrical angle of 120°, thereby reducing the cogging torque of the motor while maintaining the electrical characteristics as the motor.

Figure 9:
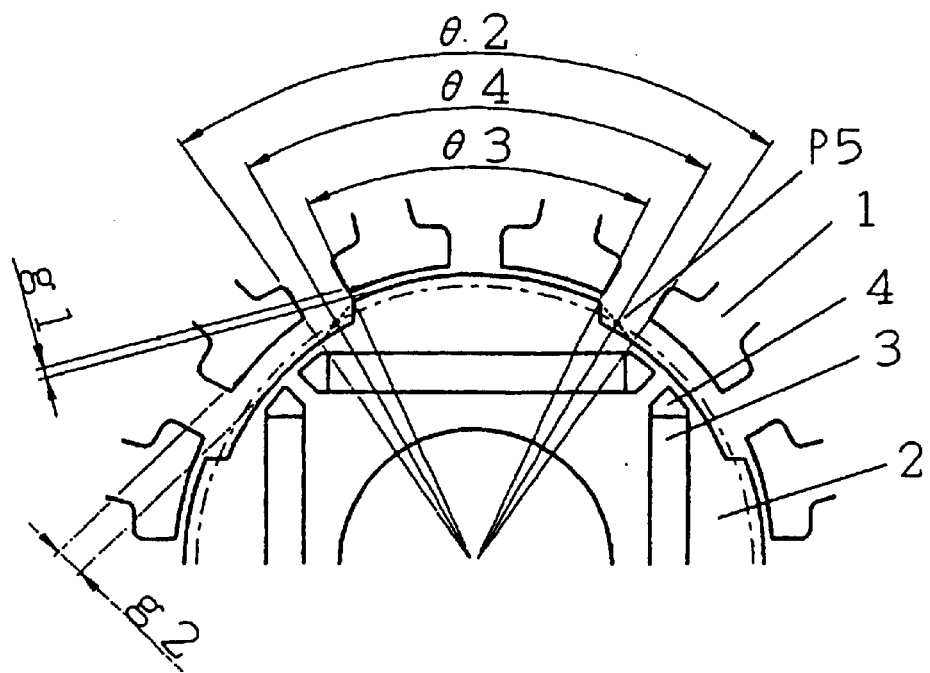
FIG. 9 is a view explaining the sizes of gaps in another embodiment of the present invention.
Figure 10:
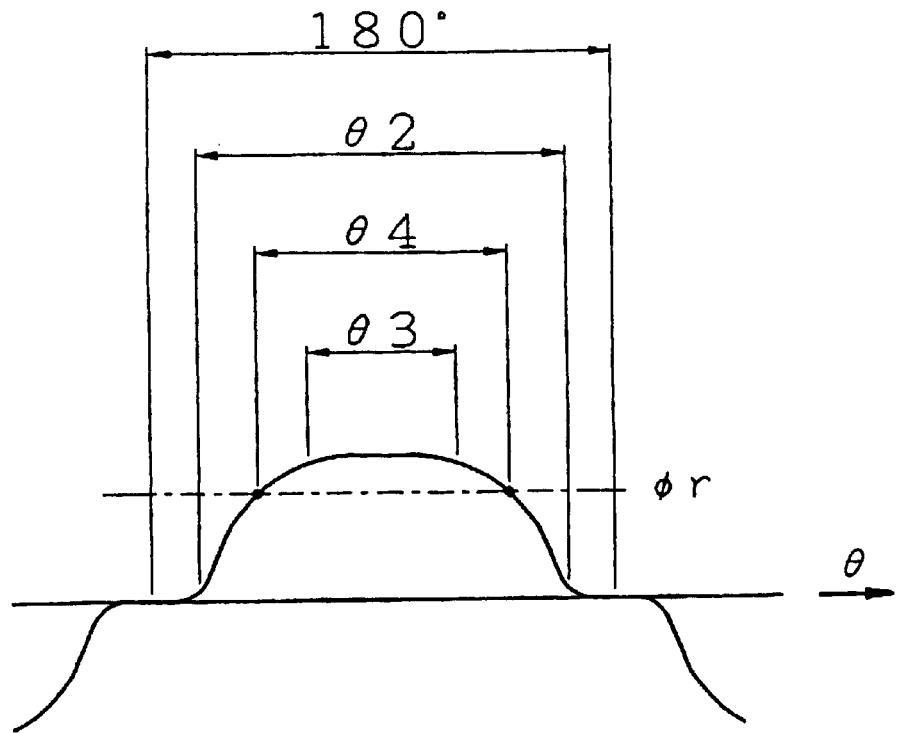
FIG. 10 is a view showing the magnetic flux distribution in the gaps of FIG. 9.

Referring to FIG. 9 and FIG. 10, the following description will explain magnetic gaps between the facing rotor 2 and stator 1 as another embodiment of the present invention. FIG. 9 is the same as FIG. 2, but indicates the magnetic gap in the salient area opening angle θ3 of magnetic pole of the rotor 2 as g1 and the magnetic gap in the area of the effective opening angle θ2 of magnetic pole of the rotor 2 excluding the salient area opening angle θ3 of magnetic pole as g2. Note that, in FIG. 9, the magnetic gap in a portion of this magnetic pole beyond the effective opening angle θ2 of magnetic pole is also shown as g2. Moreover, P5 represent the intersecting points of the straight lines (the broken lines in FIG. 9) drawn from the ends of the outer rim of the rotor 2 in the salient area opening angle θ3 of magnetic pole to the ends of the outer rim of the rotor 2 in the effective opening angle θ2 of magnetic pole and lines indicating an opening angle θ4 of the electrical angle of 120°. Further, a circular arc line (the alternate long and short dash line in FIG. 9) drawn about the center of the shaft hole of the rotor 2 to cross the intersecting points P5 is also shown.

As explained in FIG. 7 and FIG. 8, in this type of three-phase motor, by achieving the effective opening angle of magnetic pole of the electrical angle 120°, the electrical characteristics and the cost performance become relatively high, and therefore it is also necessary to arrange the magnetic flux distribution in the gaps to correspond to the above conditions. When the motor is to be rotated by a combination of supplied power to selected two phases, it is possible to continuously supply power in a stable manner by switching the respective phases at the electrical angle of 120° as explained in FIG. 7.

If the same electrical characteristics as those obtained by pure sinusoidal driving are to be obtained as the electrical characteristics of the motor, at least an induced voltage in an electrical angle area between a switching of power supply and the next switching of power supply needs to have a value equal to or higher than an induced voltage of sinusoidal driving. Accordingly, the rotor must have a magnetic flux distribution that generates such an induced voltage. Thus, a necessary induced voltage waveform is similar to a magnetic flux distribution for obtaining such an induced voltage waveform, and a portion of the magnetic pole of the rotor corresponding to a target power supply area corresponds to an area of the rotor's outer rim from the vicinity of the end of the salient area opening angle θ3 of magnetic pole that is passing through a tooth provided with a winding for an arbitrary phase to the end of the effective opening angle θ2 of magnetic pole.

In the present invention, the magnetic flux density in the above area is set so that magnetic flux density ratio φr satisfies $0.75 \leq \phi r < 1$ when the magnetic flux density in the gap in the salient area opening angle θ3 of magnetic pole is 1. A value within this range of values of the magnetic flux density ratio φr is to be selected based on the required electrical characteristics for the motor and the degree of reduction of cogging torque.

Now, the target induced voltage waveform in an area where power is supplied to arbitrarily selected two phases is a change between the electrical angle of 30° and 90°. At this time, if the induced voltage is sinusoidal wave, suppose that the value at the electrical angle of 90° is 1, the value increases from 0.5 at the electrical angle of 30° and changes up to 1 at the electrical angle of 90°. The average in this section is given by $$(0.5+1)/2=0.75 \qquad (2),$$

and the induced voltage value in the equivalent area of the induced voltage in this section is given by following equation (3).

$$\frac{3}{\pi}\int_{30°}^{90°}\sin\theta\,d\theta \cong 0.827 \qquad (3)$$

Moreover, since the induced voltage value at the intermediate point of electrical angle in the target area is the phase of 60° in electrical angle, it is given by following equation (4).

$$\sin 60° \cong 0.8666 \qquad (4)$$

In order for the induced voltage of the selected phase to have an induced voltage value equivalent to that of sinusoidal wave in the above power supply area, a magnetic flux distribution area showing the above values is required. If a motor with high output is required, the values are set to be higher. Although values to be used are determined depending on the degree of reduction of cogging torque and required electrical characteristics, the gap is determined using a value around and no less than the value shown by equation (4) when the phases are to be switched smoothly in respect of the electrical characteristics; a value around and no less than the value shown by equation (3) when the same electrical characteristics are to be obtained effectively; or a value around and no less than the value shown by equation (2) when a slight degradation of electrical characteristics is acceptable. Besides, for portions in the salient area opening angle θ3 of magnetic pole and the effective opening angle θ2 of magnetic pole, effective allotment of magnetic flux density is suitably selected to mutually cancel the cogging torques.

Accordingly, since the amount of magnetic flux that is directly concerned in the cogging torque by the salient area of magnetic pole of the rotor and the cogging torque in a portion of the effective magnetic pole portion excluding the salient area of magnetic pole is in inverse proportion to the square of the size of the gaps in the respective portions, if either of the gaps is determined, the other gap can be calculated by the following equation (5).

$$0.75 \leq \{(g1/g2)^2+1\}/2 < 1 \qquad (5)$$

When the contents of the above explanation is confirmed with referring to FIG. 9, in order to ensure a magnetic flux distribution necessary for generating an induced voltage required in the section of opening angle θ4 of the electrical angle of 120°, like the above, at least the effective opening angle θ2 of magnetic pole is necessary in an area of an opening angle of no less than the opening angle θ4 of the electrical angle of 120° for the magnetic pole of the rotor 2. In FIG. 9, the effective opening angle θ2 of magnetic pole is larger than the opening angle θ4 of the electrical angle of 120° by at least an amount of one slot opening angle. Moreover, the salient area opening angle θ3 of magnetic pole on the outer rim of the rotor 2 is smaller than the opening angle θ4 of the electrical angle of 120° by an amount of one slot opening angle. When the magnetic flux density in the salient area opening angle θ3 of magnetic pole is 1, if there is the above-mentioned amount of magnetic flux at the intersecting points P5 of the lines from the ends of the rotor's outer rim in the salient area opening angle θ3 of magnetic pole to the ends of the rotor's outer rim in the effective opening angle θ2 of magnetic pole and the lines of the opening angle θ4 of the electrical angle of 120° with respect to the magnetic pole, it is possible to maintain the electrical characteristics as the motor.

In the present invention, since the gap g2 is set so that the magnetic flux density ratio φr at the intersecting point P5 has an arbitrary value between 0.75 and 1, it is possible to ensure a desired induced voltage in the 120° section for the motor. FIG. 10 is an illustration showing the state of the magnetic flux distribution in the gaps of this magnetic pole shown in FIG. 9. In FIG. 10, θ4 corresponds to the electrical angle of electrical angle of 120°, and magnetic flux in an area corresponding to a target power supply section of the motor is ensured. Note that, according to the concept of the present invention, when the magnetic flux density in the gap in the salient area opening angle θ3 of magnetic pole and the magnetic flux density in the gap in an area beyond the salient area opening angle θ3 of magnetic pole are the same, i.e., the magnetic flux density ratio is 1, the salient area opening angle θ3 of magnetic pole is meaningless and cogging torque is not reduced, and therefore, this value can not be selected for the magnetic flux density ratio.

Figure 11:
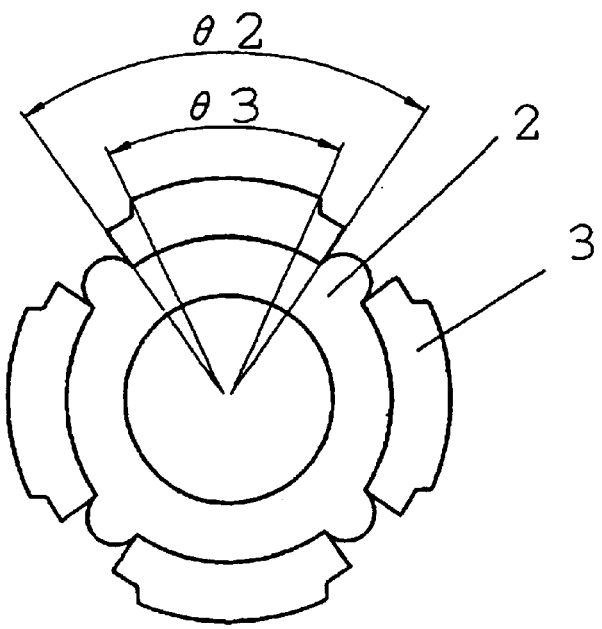
FIG. 11 is a view showing one example of another rotor structure adopting the present invention.
Figure 12:
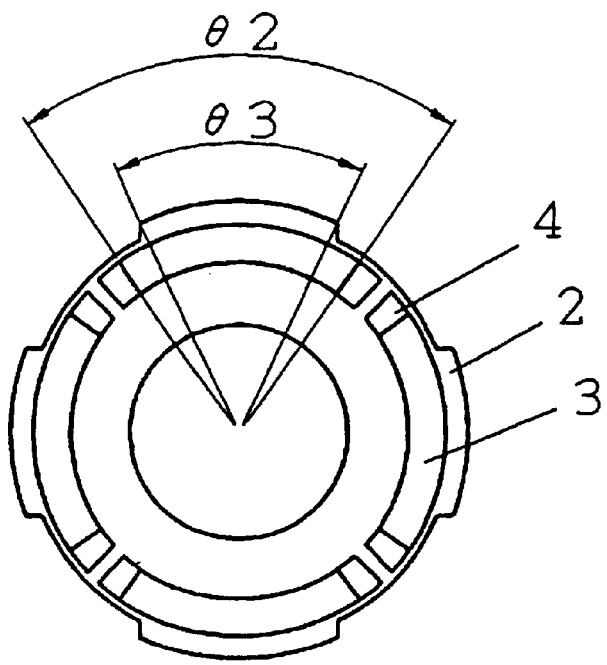
FIG. 12 is a view showing one example of another rotor structure adopting the present invention.

Furthermore, with reference to FIG. 11, the following description will explain another embodiment of the present invention. FIG. 11 illustrates an example in which the salient area opening angle θ3 of magnetic pole and effective opening angle θ2 of magnetic pole of the rotor 2 are formed by a simple permanent magnet. Moreover, as still another example, an embodiment of the present invention is shown in FIG. 12. In contrast to the example of FIGS. 8 and 9 formed by flat plate-like permanent magnets, the example of FIG. 12 is formed by circular arc permanent magnets. In both of FIG. 11 and FIG. 12, settings of the salient area opening angle θ3 of magnetic pole and the effective opening angle θ2 of magnetic pole and determination of the gap in each portion between the rotor 2 having such a structure and the stator 1 that is to be assembled with the rotor 2 are made in the above-described manner.

Figure 13:
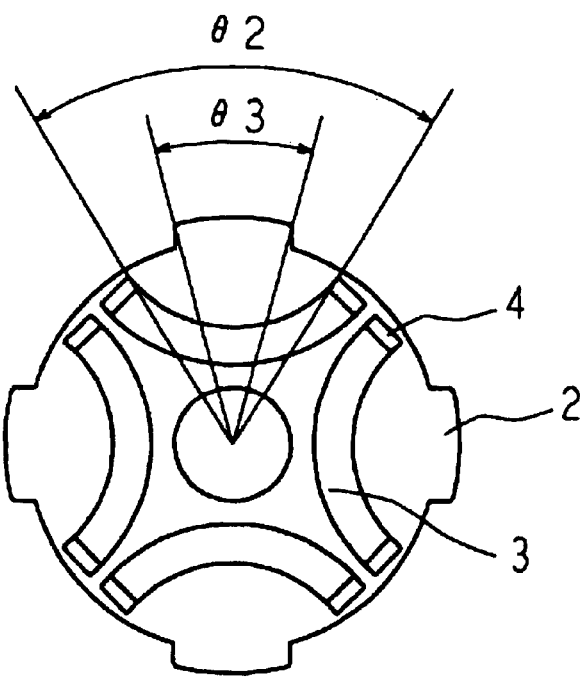
FIG. 13 is a view showing one example of another rotor structure adopting the present invention.

FIG. 13 shows still another embodiment of the present invention. Like the one shown in FIG. 12, this embodiment is constructed by circular arc permanent magnets, but the permanent magnets are arranged in rhombic form instead of circular form (FIG. 12). The magnetic flux distribution in the magnetic material is scattered with respect to the alignment of the magnets and the same magnetic flux distribution as in the case of using flat-plate magnets is obtained in the gaps, and therefore the same effects as those of FIG. 2 are obtained. Settings of the salient area opening angle θ3 of magnetic pole and the effective opening angle θ2 of magnetic pole and determination of the gap in each portion between the rotor 2 having such a structure and the stator 1 that is to be assembled with the rotor 2 are made in the above-described manner. Note that, in this case, the effective opening angle θ2 of magnetic pole becomes a portion having a low magnetic resistance to the gap in the vicinity of the outer rim of the rotor 2 because the magnetic flux is transmitted from the permanent magnet toward the gap through the magnetic material.

As the above embodiment illustrates a rotor structure other than that shown in FIG. 11, by forming the salient area opening angle θ3 of magnetic pole of the rotor 2 of the present invention with the use of the magnetic material of the rotor 2, it is possible to ensure a magnetic flux path to the gap in this portion and reduce the magnetic resistance for the permanent magnet in a portion having a large magnetic resistance due to a slot.

According to the present invention, it is possible to significantly reduce the cogging torque without skewing the permanent magnets and decrease the costs because a permanent magnet of a skewed area is not used only for the purpose of reducing the cogging torque as in conventional examples. In particular, compared with a recent motor in which skewing is applied to improve the motor performance by using expensive rare-earth magnets as permanent magnets, the advantages of the present invention are significant.

Moreover, regarding the phase voltages which are often used for driving this type of motor, even if the effective opening angle of magnetic pole is selectively narrowed in response to power supply at an electrical angle of 120°, the present invention can be implemented without having any effect on the reduction of cogging torque. Furthermore, the present invention is implemented by simply forming a necessary salient area in punching the core of the rotor as shown by many embodiments, and thus the rotor can be easily manufactured.

Besides, in the case where drive of the motor is controlled by a leading current relative to the position of the rotor, since the salient area can be used as the magnetic flux path that is concerned in reluctance torque, it is possible to select a control method from a wide range of choice. Additionally, reduction of cogging torque can be achieved regardless of the stator type such as concentrated winding and distributed winding. Therefore, this type of motor can be used in almost every application. Thus, with the application of the present invention, noise and vibration caused by cogging torque of equipment into which the motor is incorporated can be reduced and eliminated, and the motor is usable in equipment that does not allow cogging torque, depending on applications.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A brushless DC motor comprising a rotor to which a permanent magnet is attached; and a stator having a plurality of slots, characterized in that:

an effective opening angle of a magnetic pole of said rotor about an axis of rotation of said rotor is θ2 and a salient area opening angle of the magnetic pole formed within the effective opening angle θ2 is θ3, the angles θ2 and θ3 being so related that the cogging torque generated by said effective opening angle θ2 of the magnetic pole and the cogging torque generated by said salient area opening angle θ3 of magnetic pole are mutually in antiphase, so as to cause the two torques to cancel each other.

2. The brushless DC motor as set forth in claims 1, characterized in that:

the salient area opening angle θ3 of magnetic pole of said rotor is formed by a magnetic material holding a permanent magnet therein.

3. The brushless DC motor comprising a rotor to which a permanent magnet is attached; and a stator having a plurality of slots, characterized in that:

when an effective opening angle of magnetic pole of said rotor that was set to a predetermined opening angle whose base is a center of a shaft hole of said rotor is θ2 and a salient area opening angle of magnetic pole formed within the effective opening angle θ2 of magnetic pole is θ3, the opening angles θ2 and θ3 are set so that cogging torque generated by said effective opening angle θ2 of magnetic pole and cogging torque generated by said salient area opening angle θ3 of magnetic pole are mutually in antiphase; and having a relationship $$0.75 \leq \{(g1/g2)^2 + 1\}/2 < 1$$

where g2 is a gap between a recessed area of the effective opening angle θ2 of magnetic pole of said rotor and said stator, and g1 is a gap between said rotor and said stator in any area of the salient area opening angle θ3 of magnetic pole.

4. The brushless DC motor as set forth in claims 3, characterized in that:

the salient area opening angle θ3 of magnetic pole of said rotor is formed by a magnetic material holding a permanent magnet therein.

5. A brushless DC motor comprising a rotor to which a permanent magnet is attached; and a stator having a plurality of slots, characterized in that:

when an effective opening angle of magnetic pole of said rotor that was set to a predetermined opening angle whose base is a center of a shaft hole of said rotor is θ2 and a salient area opening angle of maguetic pole formed within the effective opening angle θ2 of magnetic pole is θ3, the opening angles θ2 and θ3 are set so that cogging torque generated by said effective opening angle θ2 of magnetic pole and cogging torque generated by said salient area opening angle θ3 of magnetic pole are mutually in antiphase;

the effective opening angle θ2 of magnetic pole of said rotor is not smaller than an electrical angle of 120° and is an opening angle formed with both edges of stator teeth closest to the electrical angle of 120°, the salient area opening angle θ3 of magnetic pole of said rotor is not larger than the electrical angle of 120° and is an opening angle formed with both edges of stator teeth closest to the electrical angle of 120°, and a recessed area wider than a gap in the salient area opening angle θ3 of magnetic pole of said rotor is formed at least in a portion of the effective opening angle θ2 of magnetic pole beyond the salient area opening angle θ3 of magnetic pole.

6. The brushless DC motor as set forth in claim 5, characterized in that:

the salient area opening angle θ3 of magnetic pole of said rotor is formed by a magnetic material holding a permanent magnet therein.

7. The brushless DC motor as set forth in claim 5, characterized by having a relationship $$0.75 \leq \{(g1/g2)^2 + 1\}/2 < 1$$

where g2 is a gap between said recessed area of the effective opening angle θ2 of magnetic pole of said rotor and said stator, and g1 is a gap between said rotor and said stator in any area of the salient area opening angle θ3 of magnetic pole.

8. The brushless DC motor as set forth in claim 7, characterized in that:

the salient area opening angle θ3 of magnetic pole of said rotor is formed by a magnetic material holding a permanent magnet therein.

* * * * *

UNITED STATES PATENT AND TRADEMARK OFFICE
CERTIFICATE OF CORRECTION

PATENT NO. : 6,774,521 B2
DATED : August 10, 2004
INVENTOR(S) : Hirohide Inayama et al.

It is certified that error appears in the above-identified patent and that said Letters Patent is hereby corrected as shown below:

Column 11,
Line 57, delete "claims" and substitute -- claim --.

Column 12,
Line 16, delete "claims" and substitute -- claim --.

Signed and Sealed this

Twelfth Day of April, 2005

JON W. DUDAS
*Director of the United States Patent and Trademark Office*